United States Patent [19]

Lohr, Jr. et al.

[11] 3,989,657
[45] Nov. 2, 1976

[54] STABILIZATION OF POLYBUTADIENE RESIN WITH METAL SALT

[75] Inventors: Delmar F. Lohr, Jr.; Edward Leo Kay, both of Akron, Ohio

[73] Assignee: The Firestone Tire & Rubber Company, Akron, Ohio

[22] Filed: Nov. 13, 1972

[21] Appl. No.: 306,067

[52] U.S. Cl. .......................... 260/23.7 M; 260/45.75; 260/45.75 R; 260/42.47; 526/57; 526/19
[51] Int. Cl.² .......................................... C08L 91/00
[58] Field of Search ............... 260/23.7 M, 45.7 PS, 260/87.1, 23.7 R, 41 A, 45.7 S, 45.75 R, 27 BB

[56] References Cited
UNITED STATES PATENTS

| | | | |
|---|---|---|---|
| 3,156,666 | 11/1964 | Pruett | 260/41 A |
| 3,196,134 | 7/1965 | Donat | 260/87.1 |
| 3,317,446 | 5/1967 | Wilder | 260/27 BB |
| 3,350,346 | 10/1967 | Maxson | 260/45.75 |
| 3,511,795 | 5/1970 | Brodie | 260/23.7 |
| 3,681,276 | 8/1972 | Nagahisa | 260/23.7 R |

OTHER PUBLICATIONS

"Handbook of Plastic" Symonds, 1949, p. 1025.

*Primary Examiner*—Lewis T. Jacobs
*Assistant Examiner*—W. E. Parker

[57] ABSTRACT

The incorporation of a metal salt of a fatty acid and/or organic sulfonic acid into a polybutadiene resin greatly enhances the resistance thereof to thermoxidative deterioration.

33 Claims, No Drawings

STABILIZATION OF POLYBUTADIENE RESIN WITH METAL SALT

FIELD OF THE INVENTION

This invention relates to butadiene polymers and copolymer resins, and more particularly to increasing the resistance of such resins to deterioration of the mechanical properties upon exposure to heat and air.

BACKGROUND OF THE INVENTION

Butadiene polymer and copolymer resins, particularly those having, in uncured state, a high proportion of butadiene units incorporated in 1, 2-configuration, have come into considerable use, particularly as electrically insulating structural components, friction elements and the like. Particularly since these resins exhibit good mechanical properties, at least initially, at high temperatures, they are attractive candidates for applications in which they will be exposed to high temperatures. At temperatures above about 316° C. (600° F.), however, the mechanical properties of these resins tend to slowly degrade over a period of time, which excludes them from many applications for which they would otherwise be very suitable. To date, however, there does not appear to have been any successful development of enhanced heat-resistant resins of this type.

Accordingly, it is an object of this invention to increase the resistance of butadiene polymer and copolymer resins to deterioration by heat and air.

Another object is to provide such heat resistant resins which will have physical and chemical properties undiminished in comparison with these resins as heretofore supplied.

A further object is to improve the heat resistance of such resins by incorporating therein modest amounts of compounding ingredients which are inexpensive and readily available, and which present no dangers or inconvenience involving toxicity, corrosiveness or the like.

SUMMARY OF INVENTION

The above and other objects are secured, in accordance with this invention in compositions comprising:

|  | Parts by Weight |
| --- | --- |
| Polybutadiene resin | 100 |
| A metal salt of a fatty acid and/or organic sulfonic acid | 0.5 – 6.0 |

The composition being cured by heating with presence of:

|  |  |
| --- | --- |
| A peroxide curing agent | 0.5 – 6.0 |

The above ingredients are, of course, exclusive of other filling, reinforcing and compounding ingredients such as silica, glass fiber, glass fabric, asbestos, flame resisters, and the like.

DESCRIPTION OF THE PREFERRED EMBODIMENTS

The Polybutadiene Resins

These may be any resins which are based on polymers of butadiene or copolymers of butadiene with up to 60%, based on the copolymers, of styrene. Also minor proportions, say up to 15% based on the copolymer of other ethylenically unsaturated compounds may be incorporated in the copolymers. These resins are usually prepared by (co) polymerizing the monomers by means of free radical or anionic catalysts to a relatively low molecular weight, say 1000–200,000, so that they are of at least a flowable consistency. These low molecular weight (co) polymers are then incorporated with any desired fillers, reinforcing fibers or fabrics, pigments, etc., peroxide or other curing agents if desired, etc., and the composite is cured under heat and pressure to produce the desired finished article.

More particularly, there have recently been developed a class of polybutadiene resins having at least 40%, and preferably at least 60% by weight, of butadiene in the polymer molecule, and having at least 80% by weight of the butadiene therein in the vinyl type of butadiene repeating unit structure. The average molecular weight (determined by intrinsic viscosity measurement) is at least 12,500 and the molecular weight distribution is such that at least 50%, and preferably 90%, of the polymer has a molecular weight above 10,000 and at least 95% has a molecular weight above 2,000. It has been found that the presence of higher proportions of lower molecular weight polymers than allowed by these limitations causes slow curing rates and poor physical properties in the cured product. For good processibility and good flow during molding the average molecular weight should be no greater than 55,000. This corresponds to an intrinsic viscosity of about 0.7 taken at 25° C. or about 0.68 taken at 30° C. The resin should also have a dilute solution viscosity of 0.2–0.7, preferably 0.3–0.6. The butadiene units are incorporated into the polymeric chain largely in the 1,2-configuration, preferably at least 80% of the butadiene units present being in this configuration. These polymers are cured by incorporating, per 100 parts of polymer, approximately 0.5–6 parts, and preferably 1.5–3.0 parts, by weight of dicumyl peroxide (or an equivalent weight of any other peroxide giving radicals of the structure $R_2(CH_3)$ CO. , where R independently in each occurrence represents a hydrocarbon radical of 1–20 carbon atoms), and heating the polymers, usually under pressure. The curing temperature is advantageously at least 250° F. (121° C.), preferably about 300°–350 F. (149°–177° C.). Generally, no advantage in the process or product is obtained by exceeding a temperature of 420° F. (216° C.). Obviously, the higher the temperature the shorter will be the curing time required. Generally at 350° F. (177° C.) a satisfactory cure is obtained in less than four minutes, and in some cases even within a few seconds. Cure times of more than four minutes usually provide no added advantage. Where fast cures are desired it is necessary to use a filler to avoid crazing or cracking. A filler, such as silica, is advantageously used in the proportion of 25–65, preferably 40–60, volume per cent based on the combined resin-filler composition. Also the resins may be incorporated with glass fiber, either as chopped filler or else as glass fabric in a laminate, in which case the glass fiber will serve the purpose of a filler in preventing crazing and cracking on fast cures.

More particularly with regard to the inclusion of fillers, the present invention is of particular advantage in the stabilization of compositions containing silica fillers in amounts of 150 to 500 parts by weight per 100 parts by weight of butadiene polymer or copolymer. In such cases it is desirable to include 0.5 to 2.0 parts per 100 parts of silica of an agent for bonding the filler to the polybutadiene resin such as an unsaturated-group-containing silane on the order of vinyl triacetoxysilane, vinyl tributoxy silane, vinyl trimethoxy silane, vinyl triethoxy silane.

The Metal Salts of Fatty Carboxylic Acids or Organic Sulfonic Acids

This may be any metal salt, and preferably a Group II-A or II-B metal salt (see "Handbook of Chemistry and Physics", 43rd Ed., The Chemical Rubber Publishing Co., 1961, pages 448 and 449), of an organic acid having an organic radical containing from 8 to 26 carbon atoms and a carboxylic acid or a sulfonic acid group, such as fatty acid soaps on the order of calcium 2-ethylhexanoate, calcium octoate, calcium laurate, calcium myristate, calcium stearate, alcium palmitate, calcium oleate, calcium arachidate, calcium abietate, magnesium stearate, magnesium octoate, magnesium oleate, zinc stearate, zinc oleate, zinc laurate, zinc abietate, cadmium stearate, and the like; or organic sulfonate salts of metals such as sodium dodecylbenzene sulfonate, calcium dodecylbenzene sulfonate, magnesium dodecylbenzene sulfonate, zinc dodecylbenzene sulfonate and the like; and mixtures of any two or more of such salts in any proportions.

The Cured Resins

The cured resins produced in accordance with this invention have exceptional resistance to deterioration of physical properties, particularly modulus and flexural strength, upon long time exposure at high temperatures, i.e., temperatures above 400° F. (204° C.) and up to 700° F. (371° C.). Thus, the products, upon exposure to temperatures of 400° F. (204° C.) for 1000 hours, or 600° F. (316° C.) for 100 hours, will retain upwards of 80% of their modulus and upwards of 60% of their flexural strength. The resins are therefore applicable in many situations where heat exposure is a factor, as in structural electrical components, cooking utensil handles, and automobile engine compartment components.

With the foregoing general discussion in mind, there are given herewith detailed experimental examples of the practice of this invention. All parts and percentages given are on the basis of weight, unless otherwise explicitly stated.

EXAMPLE I

|  | Parts by Weight |
|---|---|
| Polybutadiene* | 100 |
| Silica | 380 |
| Vinyl triacetoxysilane | 3 |
| Dicumyl peroxide | 3 |
| Hexane | 150 |
| Metal carboxylate or sulfonate (Type per Table I) | 0.5 – 5.0 (per Table I |

*90% of butadiene units in 1, 2-configuration; molecular weight parameters $M_w$ = 29,000, $M_n$ = 23,000, DSV = 0.3

A series of compositions was made up in accordance with the above schedule, varying the types and amounts of metal carboxylate or sulfonates in the several compositions as indicated in Table I. In the case of each composition, all of the ingredients, in the proportions selected for that composition, were thoroughly mixed together, and the mixture poured into an evaporating dish to the depth of 0.5 inch. The dish was then placed in a vacuum oven, where the hexane was removed at 125° F. (52° C.) under a pressure of 1–5 mm. of mercury absolute. Alternatively, the resin could be heated to a flowable melt and mixed with the other ingredients of the composition without the use of a solvent. Each such dried composition was then removed and broken up, and molded in a compression mold into several test bars 1×3×0.1 inch. Temperature of molding was 350° F. (177° C.), total load on the die was 10–20 tons normal to the 1×3 inch face, and time was 4 minutes. The modulus and flexural strength was determined upon control bars from each composition, and the average recorded in Table I with the notation "O" under the heading "Time (hr.)" to indicate that these bars were not exposed to heat degradation. Other bars of each composition were exposed in an air oven at temperatures, and for durations of time indicated in the table, and the modulus and flexural strength determined and also recorded in Table I, together with the percentage decrease or increase of these properties as compared to the controls. Set forth in Table I are the results.

The addition of 0.5 to 5.0 parts of a metal fatty carboxylate per 100 parts resin improves both the retention of flexural modulus and flexural strength after exposure of the samples to heat and air (Runs Nos. 1–22). When the metal fatty carboxylate is calcium stearate, the optimum level appears to be 2–4 parts (Runs Nos. 1–14). A similar improvement in flexural properties is observed with the use of metal salts of dodecylbenzenesulfonates (Runs Nos. 23–28).

It is obvious that many different combinations of metal acylates can be used without departing from the intent of the invention.

TABLE I

| METAL CARBOXYLATE OR SULFONATE | | HEAT EXPOSURE | | FLEXURAL STRENGTH | | FLEXURAL MODULUS | | RUN NO. |
|---|---|---|---|---|---|---|---|---|
| Type | Amount (parts) | Temp. (° F.) | Time (hr.) | psi | % Retention | psi × 10⁻⁶ | % Retention | |
| None | 0 | — | 0 | 11,100 | — | 1.31 | — | 1 |
|  |  | 600 | 100 | 1,100 | 10 | 0.12 | 9 | 2 |
| Calcium Stearate | 0.5 | — | 0 | 10,000 | — | 1.41 | — | 3 |
|  |  | 600 | 100 | 1,700 | 17 | 0.20 | 14 | 4 |
|  | 1.00 | — | 0 | 10,400 | — | 1.37 | — | 5 |
|  |  | 600 | 100 | 3,400 | 33 | 0.40 | 29 | 6 |
|  | 2.00 | — | 0 | 11,400 | — | 1.43 | — | 7 |
|  |  | 600 | 100 | 7,000 | 61 | 0.98 | 69 | 8 |
|  | 3.00 | — | 0 | 10,700 | — | 1.40 | — | 9 |
|  |  | 600 | 100 | 7,200 | 67 | 1.11 | 79 | 10 |
|  | 4.00 | — | 0 | 11,900 | — | 1.41 | — | 11 |

TABLE I-continued

| METAL CARBOXYLATE OR SULFONATE | | HEAT EXPOSURE | | FLEXURAL STRENGTH | | FLEXURAL MODULUS | | RUN NO. |
|---|---|---|---|---|---|---|---|---|
| Type | Amount (parts) | Temp. (°F.) | Time (hr.) | psi | % Retention | psi × 10⁻⁶ | % Retention | |
| | | 600 | 100 | 7,600 | 64 | 0.94 | 66 | 12 |
| | 5.00 | — | 0 | 10,500 | — | 1.27 | — | 13 |
| | | 600 | 100 | 7,100 | 68 | 0.92 | 72 | 14 |
| Magnesium Stearate | 2.96 | — | 0 | 10,900 | — | 1.27 | — | 15 |
| | | 600 | 100 | 8,600 | 79 | 1.17 | 92 | 16 |
| | | — | 0 | 11,200 | — | 1.30 | — | 17 |
| | | 400 | 500 | 7,600 | 68 | 1.58 | 121 | 18 |
| Zinc Stearate | 3.10 | — | 0 | 11,400 | — | 1.45 | — | 19 |
| | | 600 | 100 | 7,200 | 63 | 1.06 | 73 | 20 |
| | | — | 0 | 9,800 | — | 1.22 | — | 21 |
| | | 400 | 500 | 7,300 | 74 | 1.57 | 129 | 22 |
| Sodium Dodecylbenzene Sulfonate | 3.00 | — | 0 | 10,500 | — | 1.34 | — | 23 |
| | | 600 | 100 | 7,100 | 68 | 0.96 | 72 | 24 |
| Calcium Dodecylbenzene Sulfonate | 3.00 | — | 0 | 9,500 | — | 1.43 | — | 25 |
| | | 600 | 100 | 5,800 | 61 | 0.85 | 59 | 26 |
| Magnesium Dodecylbenzene Sulfonate | 3.00 | — | 0 | 10,000 | — | 1.46 | — | 27 |
| | | 600 | 100 | 5,000 | 50 | 0.70 | 48 | 28 |

What is claimed is:

1. Process of producing a resin composition having a high resistance to deterioration of its mechanical properties upon prolonged exposure to heat, which comprises subjecting to curing temperatures a composition containing

| | Parts by Weight |
|---|---|
| A butadiene polymer or copolymer resin | 100 |
| A metal salt of an organic sulfonic acid | 0.5 – 6.0 |
| A peroxide curing agent | 0.5 – 6.0 | the resin being a homopolymer of butadiene or a copolymer of butadiene and styrene and containing at least 40 per cent by weight of butadiene, and at least 80 per cent of the butadiene repeating units in the homopolymer or copolymer being in the 1,2 configuration, the peroxide giving radicals of the structure $R_2(CH_3)CO.$; and the salt containing from 8 to 26 carbon atoms.

2. Process according to claim 1 wherein the composition further contains, by weight

| A silica filler | 150 – 500 parts per 100 parts of resin |
|---|---|
| A silane bonding agent | 0.5 – 2.0 parts per 100 parts of silica filler. |

3. Process according to claim 1 wherein the metal salt is a metal alkylaryl sulfonate.

4. Process according to claim 1, wherein the peroxide curing agent is dicumyl peroxide.

5. Process according to claim 1, wherein the proportion of metal salt is 2.0–4.0.

6. Process according to claim 4, wherein the peroxide curing agent is dicumyl peroxide.

7. Process according to claim 1, wherein the metal component of the metal salt is magnesium, calcium, zinc or sodium.

8. Process according to claim 6, wherein the metal component of the salt is magnesium.

9. Process according to claim 6, wherein the metal component of the metal salt is calcium.

10. Process according to claim 6, wherein the metal component of the metal salt is zinc.

11. Process according to claim 6, wherein the metal component of the metal salt is sodium.

12. A composition curable to a hard resin composition having enhanced resistance to deterioration of its mechanical properties by exposure to heat and air comprising

| | Parts by Weight |
|---|---|
| A butadiene polymer or copolymer resin | 100 |
| A metal salt of an organic sulfonic acid | 0.5 – 6.0 |
| A peroxide curing agent | 0.5 – 6.0 | the resin being a homopolymer of butadiene or a copolymer of butadiene and styrene and containing at least 40 per cent by weight of butadiene, and at least 80 per cent of the butadiene repeating units in the homopolymer or copolymer being in the 1,2-configuration, the peroxide giving radicals of the structure $R_2(CH_3)CO.$; and the salt containing from 8 to 26 carbon atoms.

13. Composition according to claim 12 which further contains, by weight

| A silica filler | 150 to 500 parts per 100 parts of resin |
|---|---|
| A silane bonding agent | 0.5 to 2.0 parts per 100 parts of silica filler. |

14. Composition according to claim 12, wherein the metal salt is a metal alkylaryl sulfonate.

15. Composition according to claim 12, wherein the peroxide is dicumyl peroxide.

16. Composition according to claim 12, wherein the proportions of metal salt is 2.0 – 4.0.

17. Composition according to claim 16, wherein the peroxide is dicumyl peroxide.

18. Composition according to claim 12, wherein the metal component of the metal salt is magnesium, calcium, zinc or sodium.

19. Composition according to claim 12, wherein the metal component of the metal salt is magnesium.

20. Composition according to claim 12, wherein the metal component of the metal salt is calcium.

21. Composition according to claim 12, wherein the metal component of the metal salt is zinc.

22. Composition according to claim 12, wherein the metal component of the metal salt is sodium.

23. A peroxide-cured resin composition highly resistant to deterioration of physical properties upon exposure to heat, said resin composition prepared by the process of curing

|  | Parts by Weight |
|---|---|
| A butadiene polymer or copolymer resin | 100 |
| A metal salt of an organic sulfonic acid | 0.5 – 6.0 |
| A peroxide curing agent | 0.5 – 6.0 | the resin being a homopolymer of butadiene or a copolymer of butadiene and styrene and containing at least 40 per cent by weight of butadiene, and at least 80 per cent of the butadiene repeating units in the homopolymer or copolymer being in the 1,2-configuration, the peroxide giving radicals of the structure $R_2(CH_3)CO\cdot$; and the salt containing from 8 to 26 carbon atoms.

24. Cured resin according to claim 23 which further contains by weight

| A silica filler | 150 to 500 parts per 100 parts of resin |
|---|---|
| A silane bonding agent | 0.5 to 2.0 parts per 100 parts of silica filler. |

25. Cured resin according to claim 23, wherein the metal salt is a metal alkylaryl sulfonate.

26. Cured resin according to claim 23, wherein the peroxide curing agent is dicumyl peroxide.

27. Cured resin according to claim 23, wherein the proportions of metal salt is 2.0 – 4.0.

28. Cured resin according to claim 27, wherein the peroxide curing agent is dicumyl peroxide.

29. Cured resin according to claim 23, wherein the metal component of the metal salt is magnesium, calcium, zinc or sodium.

30. Cured resin according to claim 23, wherein the metal component of the metal salt is magnesium.

31. Cured resin according to claim 23, wherein the metal component of the metal salt is calcium.

32. Cured resin according to claim 23, wherein the metal component of the metal salt is zinc.

33. Cured resin according to claim 23, wherein the metal component of the metal salt is sodium.

* * * * *